United States Patent
Smith et al.

(10) Patent No.: US 6,553,118 B1
(45) Date of Patent: Apr. 22, 2003

(54) METHOD AND APPARATUS FOR CALCULATING DC OFFSET IN A DIGITAL GYRATOR

(75) Inventors: Lane A. Smith, Easton, PA (US); Steven Brooke Witmer, Sinking Spring, PA (US); Jonathan Herman Fischer, Blandon, PA (US); Donald Raymond Laturell, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/378,771

(22) Filed: Aug. 20, 1999

Related U.S. Application Data

(63) Continuation-in-part of application No. 09/310,021, filed on May 11, 1999.

(51) Int. Cl.[7] .............................. H04M 9/00; H04M 1/00
(52) U.S. Cl. .............................. 379/413.02; 379/93.06; 379/387.02; 379/390.02; 379/399.02
(58) Field of Search .................... 379/22.01–26.01, 379/90.01, 93.01, 93.05, 93.06, 387.01, 387.02, 390.02, 398, 399.01, 399.02, 413.02

(56) References Cited

U.S. PATENT DOCUMENTS

| | | | | |
|---|---|---|---|---|
| 4,270,027 A | * | 5/1981 | Agrawal et al. | ............ 379/399 |
| 4,351,060 A | * | 9/1982 | Treiber | ........................ 379/398 |
| 4,417,099 A | | 11/1983 | Pierce | ............................ 179/2 |
| 4,629,829 A | * | 12/1986 | Puhl et al. | ................... 379/411 |
| 4,894,864 A | * | 1/1990 | Cook | .......................... 379/398 |
| 6,298,133 B1 | * | 10/2001 | Hein et al. | ................... 379/399 |
| 6,385,235 B1 | * | 5/2002 | Scott et al. | .................. 375/220 |

\* cited by examiner

*Primary Examiner*—Binh Tieu
(74) *Attorney, Agent, or Firm*—Synnestvedt & Lechner LLP

(57) ABSTRACT

A method and apparatus for controlling the DC line current on a telephone line and reducing the amount of error introduced to the system. The error is reduced by compensating for a DC error term introduced by an analog to digital converter having a DC offset. The DC offset is controlled digitally, allowing software to be used to limit the DC error in accordance with predefined parameters. Predefined parameters can be set to accommodate varying country specifications instead of using switches to control resistors and capacitors. In addition, changes in a country's requirements can be accomplished through software, instead of changing components or redesigning a circuit board. The use of software results in increased flexibility by allowing an infinite number of settings via software or software updates, allowing changes to be made quickly and easily throughout the world, and allowing error terms to be accommodated digitally.

29 Claims, 3 Drawing Sheets

METHOD AND APPARATUS FOR CALCULATING DC OFFSET IN A DIGITAL GYRATOR

RELATED APPLICATIONS

This application is a continuation-in-part of co-pending U.S. application No. 09/310,021 to Fischer et. al., entitled "Digital Gyrator," filed May 11, 1999, having at least one common inventor.

FIELD OF THE INVENTION

This invention relates to a method for regulating DC current. Specifically, it relates to a telecommunication device for regulating the DC line current on a telephone line to conform to desired parameters.

BACKGROUND OF THE INVENTION

Telephone systems in countries throughout the world have unique system requirements that need to be met in order to legally sell and use telecommunication devices within their respective borders. One of the commonly known system requirements mandates that when a telephone line goes off-hook (i.e., when the telephone line is in use), the DC current level on the line must reach a certain level within a specified period of time and maintain that level until the call is completed. The DC current level on the line must stay at a certain level in order to be interpreted by the telephone system as an active line throughout the duration of the telephone call. The current rise time and maximum current level are also regulated to prevent damage to telecommunication equipment.

In order to hold a telephone line in the off-hook condition, a specified level of current must be drawn which relates to the voltage level on the line and conforms to a country's telecommunication requirements. The desired operating current is generally expressed on a graph of current-versus-voltage, known in the art as a load-line. The load-line represents a level of resistance for voltages on a current-versus-voltage graph, allowing a level of current to be determined for a given voltage. FIG. 4 is an example of a current-versus-voltage load-line requirement to keep a telephone line in an off-hook condition. The slope of the load-line on a current-versus-voltage graph is the inverse of the line resistance.

Telephone systems develop a voltage which is a potential impressed on the telephone line between two terminals, commonly known as the tip and ring voltage. As seen in FIG. 4, the desired level of current to keep a telephone line in the off-hook condition can be achieved for a given voltage by setting an appropriate line resistance. The template illustrated in FIG. 4 is representative of the parameters set forth by a country and varies from country to country. The parameters can even change within a country due to changes in a country's requirements (e.g., if a country updates their telecommunication system).

To conform to established requirements, consumer telephone equipment, such as computer modems and telephones, must be capable of setting the DC line current on a telephone line. One method that has been used to set the DC line current on a telephone line when the telephone line goes off-hook is to place an inductor in series with a resistor across a telephone line connection and then couple the voice circuits to the line through a capacitor. As shown in FIG. 5, a commonly known prior art circuit for setting DC line current comprises resistance $R_{DC}$, capacitance C and inductance L. Inductor L is chosen to have an impedance over the 200 Hz to 4 kHz voice-band that is much larger than the impedance of the phone line and the capacitor-voice circuit combination. Virtually all the AC current flows through the capacitor and voice circuits. At DC, the capacitor looks like an open circuit and the inductor looks like a short circuit, so $R_{DC}$ sets the DC current level. The circuit of FIG. 5 is less than optimal because of the inherently bulky nature and high cost of the inductor L, the amount of time for inductor L to charge, and the need to change circuit elements in countries with different off-hook current level requirements.

Another prior art approach that has been used to control the DC line current in a telephone system replaces the inductor L of FIG. 5 with additional system components that are smaller and less expensive. The arrangement of components as shown in FIG. 6 can be used to control DC line current and is commonly known in the industry as a gyrator. The prior art gyrator depicted in FIG. 6 can be used to control DC line current without the use of an inductor L. The circuit in FIG. 6 functions like a large inductor across the telephone line and can be used in place of the prior art circuit shown in FIG. 5. The gyrator is implemented with many discrete components such as transistors, resistors, capacitors, and digitally controlled switches located close to the tip and ring telephone line interface. As shown in FIG. 6, the gyrator contains digitally controlled switches $DCS_C$ and $DCS_R$ used to switch different levels of capacitance and resistance into the gyrator circuit, respectively. By switching different levels of capacitance and resistance into the circuit, the time constant of the circuit can be changed, such that the transistors can be manipulated to provide the correct level of current on the telephone line within a specified period of time. The circuit allows different start up transient times and DC current levels to be adjusted in accordance with a user's specifications using a single circuit. The $DCS_C$ switches affect initial transient settling time and the $DCS_R$ switches affect the DC load-line. The adjustability of the circuit is established when the circuit components are installed at the time of manufacture. If the specifications change after manufacture, in order to change the device, components need to be physically changed within the device or an entirely new device needs to be installed.

Recently, a gyrator has been developed using digital processing technologies. By incorporating a gyrator into a digital device, the desired line current parameters can be achieved by adjusting parameters on a country by country basis in software. An example of a digital gyrator is disclosed and described fully in co-pending U.S. patent application No. 09/310,021 filed on May 11, 1999, entitled "Digital Gyrator," having at least one common inventor and assigned to the same assignee as the present application (attorney docket Fischer 16-28-9), and is incorporated herein by reference.

A block diagram of the prior art gyrator is depicted in FIG. 7. The gyrator depicted in FIG. 7 is used to control the DC line current flowing between tip 80 and ring 81 at the interface between the data access arrangement (DAA) 74 and the telephone company central office 72. The system controls the DC line current by first using the DAA 74 to generate an analog signal which represents the DC voltage between tip 80 and ring 81. The analog signal is then converted to digital by the analog-to-digital (A/D) converter 82 located in the coder/decoder (CODEC) 76. The resultant digital signal is then processes by the processor 78 which filters 86 and scales 88 the digital signal to achieve a digital DC current control signal, and combines the digital signal with a computer modem transmit (TX) signal 92. The combined digital signal is then converted back to analog by the digital-to-analog (D/A) converter 84. The resultant combined analog signal is then used to control a current source 94 which places a desired DC line current and an AC modem current onto the tip 80 and ring 81 interface between the DAA 74 and the telephone company central office 72.

Although the digital gyrator 70 depicted in FIG. 7 is capable of setting the DC line current on a telephone line in accordance with the specifications of various countries, a system error can occur in the resulting DC line current seen by the central office 72 between tip 80 and ring 81 that could be potentially problematic. The system error is inherent to the prior art digital gyrator 70 because, in order to control the DC line current with processor 78, a DC feedback path between the DAA 74 and the processor 78 is shared with an AC feedback path. Separate A/D converters could be used for converting the DC path and the AC path, however, it is more feasible to use a single A/D converter 82. Conventional A/D converters 82 often can accommodate only a small range of voltage at their inputs. In addition, present modem specifications (i.e., V.90) require that a modem signal-to-noise ratio (SNR) for the AC path be maintained at greater than 80dB. In order to maintain a high SNR in a gyrator 70 with an A/D converter 82 having a small input voltage range, a majority of the input range of the A/D converter 82 must be reserved for the AC voltage component of the feedback path. This means the DC portion of the feedback path must be as small as possible. In order to decrease the DC portion, the system feedback path may divide the DC voltage between tip 80 and ring 81 by a large number, e.g., 400. However, with DC values this small any DC offset in the analog circuitry, specifically in A/D converter 82, will be interpreted by processor 78 as either reduced or increased tip 80 and ring 81 voltage. Thus, significant error in the resulting DC line current level between tip 80 and ring 81 may result.

SUMMARY OF THE INVENTION

The present invention provides a digital method and apparatus for controlling the DC line current on a telephone line with a digital gyrator which has superior error handling capabilities. The invention provides superior error handling by determining the DC offset of a device, storing the DC offset, and subtracting the DC offset out of appropriate calculations performed by a processor. The digital gyrator controls the DC line current parameters with a processor, instead of electrical components such as resistors and capacitors.

DETAILED DESCRIPTION OF THE INVENTION

Figure 1:
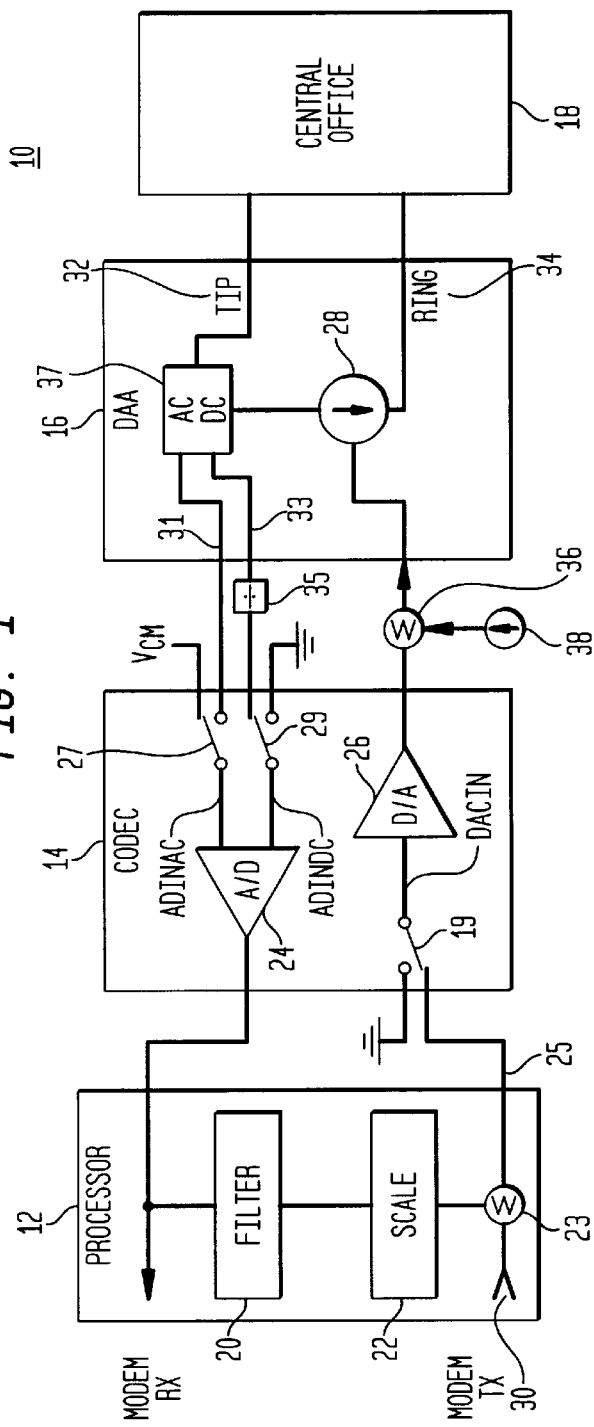
FIG. 1 is a block diagram of a digital gyrator in accordance with the present invention.

FIG. 1 is a block diagram of a gyrator 10 in accordance with the present invention. As shown in FIG. 1, gyrator 10 comprises a coder/decoder (CODEC) 14, a processor 12, and a data access arrangement (DAA) 16 containing a line current regulator 28. The processor 12 controls a filter 20, scale 22, and modem input signal 30.

In the gyrator 10 depicted in FIG. 1, when the system goes into the off-hook state (i.e., when the telephone line is in use) the DAA 16 is coupled to the central office 18 via the telephone lines 32, 34. The central office 18 maintains a voltage potential across the tip 32 and ring 34 interface of DAA 16. The DAA 16 separates the voltage potential across the tip 32 and ring 34 interface into an AC component and a DC component with AC/DC separator 37. The AC/DC separator 37 uses capacitive coupling and a resistor network to develop the AC analog signal 31, which is representative of the AC voltage across DAA 16, and a DC analog signal 33, which is representative of the DC voltage across DAA 16, respectively.

Inherent to analog-to-digital (A/D) converters such as A/D converter 24 and digital-to-analog (D/A) converters such as D/A converter 26 are a DC offset which causes the output to be non-zero when the input is zero and a gain which amplifies the input of the converters. In a preferred embodiment, the gain of A/D converter 24 and the gain of D/A converter 26 are trimmed during wafer test using methods well known in the art. Generally, a converter's DC offset does not need to be accommodated, however, the DC offsets associated with A/D converter 24 and D/A converter 26 of the present invention may affect the performance of the system. Therefore, the DC offsets of A/D converter 24 and D/A converter 26 need to be accommodated. In a preferred embodiment, the DC offset of D/A converter 26 is also accommodated during wafer test using methods well known in the art.

In accordance with the present invention, the DC offset of A/D converter 24 is sampled and stored shortly after going off-hook; thereafter processor 12 compensates for the DC offset of A/D converter 24 by subtracting the DC offset from all A/D converter 24 samples taken after the DC offset calibration period is over.

The AC analog signal 31 out of the DAA 16 is coupled to A/D converter 24 through switch 27. Switch 27 initially connects the AC input of A/D converter 24 to a common mode voltage node, $V_{CM}$, and thereafter switches to connect the AC input of A/D converter 24 to AC analog signal 31 at a time determined by the system. The DC analog signal 33 out of the DAA 16 is coupled to A/D converter 24 through switch 29. Switch 29 initially connects the DC input of A/D converter 24 to ground, and thereafter switches to connect the DC input of A/D converter 24 to DC analog signal 33 after it has been modified by divider 35. The signals 31 and 33 out of the DAA 16 are then converted from analog to digital by CODEC 14 via analog-to-digital converter 24 to create a digital signal. By initially connecting the analog-to-digital converter 24 AC input to $V_{CM}$ and the DC input to ground, the output of analog-to-digital converter 24 can be measured in the absence of any AC or DC signals to determine the DC offset of analog-to-digital converter 24. The DC offset is stored by processor 12 and used in future calculations performed by processor 12 to normalize the output of A/D converter 24 when an input signal is present. Although the analog to digital conversion in FIG. 1 is accomplished by CODEC 14, this conversion also can be accomplished by an independent analog-to-digital converter, or essentially any conversion means. The methods of converting the signal are commonly known in the art and will not be discussed in further detail.

The resulting digital signal then passes through a digital filter 20, which is controlled by processor 12 using a predefined process program. The predefined process program can be any programmable logic block or processing block where loop parameters can be programmed through either hard coding or implemented through software. The filter 20 may be fully integrated into processor 12 or may comprise a separate processor for filtering and controlling. The filter 20 functions as a variable resistance which is responsive to the digital voltage signal, such that the current rise time and the current level on the telephone line can be set in accordance with predefined specifications. The processor 12 refers to a microprocessor, data processor, digital signal processor (i.e., DSP), microcontroller, computer, state machine, or essentially any digital processing circuit.

Figure 5:
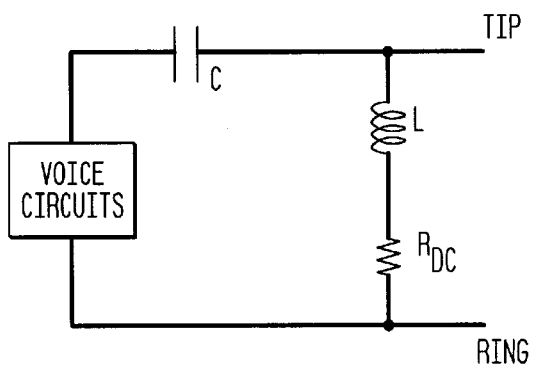
FIG. 5 is a circuit diagram of a prior art circuit for regulating DC line current.
Figure 6:
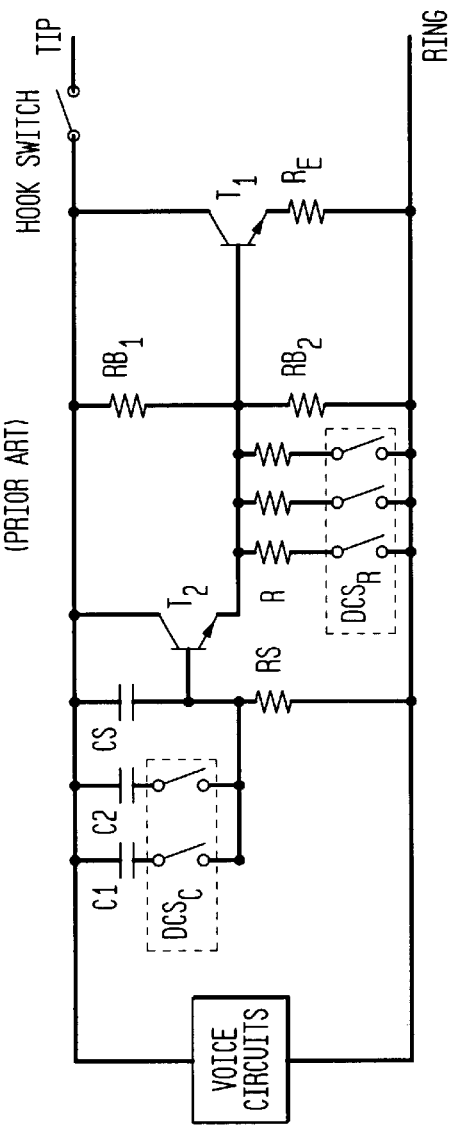
FIG. 6 is a circuit diagram of an adjustable prior art gyrator for regulating DC line current.
Figure 7:
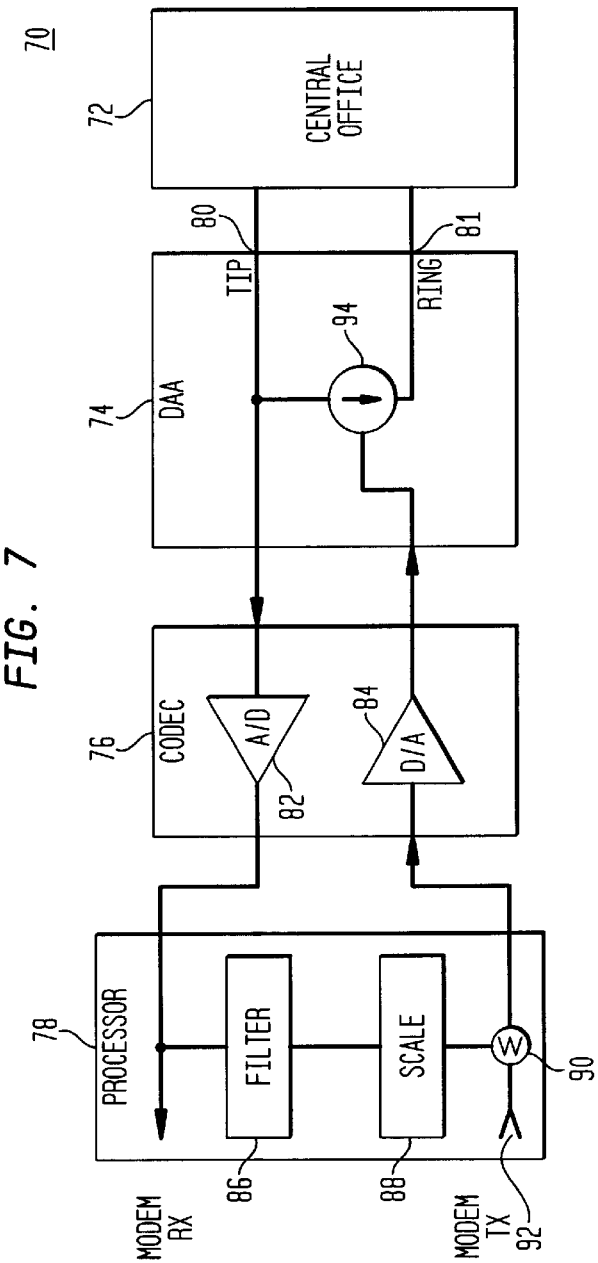
FIG. 7 is a block diagram of a digital gyrator.

The digital signal which is passed through digital filter 20 is then passed through digital scale 22 where the correct level of output in accordance with predefined specifications is developed. The digital scale 22 performs essentially the same function as the load-line, $R_{DC}$, of FIG. 5 to generate a signal such that the DC current level through the tip 32 and ring 34 pair matches the specified DC load line. Specifically, digital scale 22 is used to control the relationship between the DC voltage potential across tip 32 and ring 34 and the DC current level across tip and ring which is controlled by current source 28. For example, if digital scale 22 has a high scaling value, small changes in the voltage potential across tip and ring will result in large current changes, thereby mimicking the effect of a small load-line resistor. If digital scale 22 has a low scaling value, small changes in the voltage potential across tip and ring will result in small current changes, thereby mimicking the effect of a large load-line resistor. Digital scale 22 is controlled by processor 12 and can be either integrated within processor 12, or the processor control function and scaling function can be separated.

After the signal is filtered and scaled, the digital signal is summed at summer 23 with AC modem signal 30 to generate a digital current source control signal 25. Although the present invention is being described in terms of interfacing a modem to a telephone line, the invention can be incorporated into any device used for placing a data signal onto a telephone line. Digital current source control signal 25 comprises a digital signal which includes both the level of DC current to be placed on the tip and ring interface and a digital data signal comprising an AC modem signal to be placed on the tip and ring interface. Digital current source control signal 25 is coupled to current source 28 through digital-to-analog (D/A) converter 26, whereby digital current source control signal 25 regulates the AC modem current and DC line current characteristics of the tip and ring interface. In a preferred embodiment, potential offsets associated with D/A converter 26 are trimmed out during production wafer trim.

On startup, current source 38 is used to control variable current source 28 through summer 36. During this time, switch 19 connects the input of digital-to-analog (D/A) converter 26 to ground, allowing current source 38 to control variable current source 28 without any unwanted signals out of processor 12. Current source 38 is used as the exclusive control of variable current source 28 during startup in order to give the gyrator 10 time to settle. The time required for the circuit to settle is determined via software loaded in processor 12.

After the gyrator 10 has had time to settle, switch 19 connects the input of D/A converter 26 to current source control signal 25 for normal operation. When switch 19 connects D/A converter 26 to current source control signal 25, D/A converter 26 converts the digital signal out of the processor 12 to an analog signal. The current source control signal 25 is converted from digital to analog by D/A converter 26 within CODEC 14. The digital to analog conversion can be accomplished by CODEC 14, an independent digital-to-analog converter, or essentially any conversion means.

The resultant analog signal is then combined with the current developed by current source 38 at summer 36 to control variable current source 28 within DAA 16. Current source 38 is used on startup to provide variable current source 28 with an initial input so that it places an initial current level on the tip 32 and ring 34 interface prior to the system generating a current source control signal 25. The current source 38 serves as a starting point for generating the desired DC current level on the tip 32 and ring 34 interface. Current source 38 continues to provide current after startup in order to maintain continuity in the level of current on the tip 32 and ring 34 interface and is figured into calculations performed by processor 12. Variable current source 28 is coupled to the central office 18 by DAA 16 to indicate the hook status of the telephone line and modulate modem signal 30 onto the telephone line.

Figure 4:
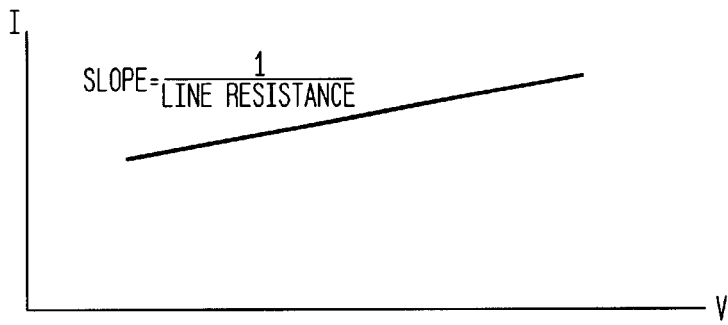
FIG. 4 is a load-line graph of a typical current-versus-voltage specification for determining current and resistance settings.

As set forth above, digital filter 20 operates based on a predefined process program implemented by processor 12. Processor 12 provides flexibility in the manner in which digital filter 20 is implemented that will be readily apparent to those in the art. For illustrative purposes, digital filter 20 may comprise a conventional low pass digital filter which passes a signal used by processor 12 to regulate the DC current rise time of the circuit and maintain the correct level of current once the desired level of current is reached. In order to control the rise time of the circuit, digital filter 20 is set to have a relatively high cutoff frequency, such as 30 Hz. It is commonly known in the industry that a high cutoff frequency will allow a value which represents a level of current through the digital filter 20 to increase rapidly. In the present invention, the digital representation of the current will rise rapidly at a rate determined by the characteristics of digital filter 20. The rise time of the current is defined in the industry as the time for the current in the system to converge to a level in accordance with a predefined specification. A typical definition of settling time is the time to converge to within 90% of the predefined value. For a first order system, this corresponds to 5 system time constants (t) where $$t = \frac{1}{2\pi f_c} \quad (1)$$

with $f_c$ being the low pass filter cutoff frequency. For example, if the initial cutoff frequency is 30 Hz, the time for the system to converge would be approximately 25 ms $((1/(2\pi*30Hz))*5=25$ ms). The output of digital filter 20 is fed into a scale 22 routine which scales the output to satisfy the voltage-to-current load-line requirements of a specific country, such as that depicted in FIG. 4. Scale 22 performs essentially the same function as $R_{DC}$ in the prior art, depicted in FIG. 5.

After the system has converged, digital filter 20 must pass only DC current, therefore, the cutoff frequency is switched to a relatively low cutoff frequency, such as 1 Hz. As is commonly known in the industry, a low cutoff frequency filter will maintain a level of DC current that is approximately constant. This longer time period for convergence is desirable once the system has reached the correct DC current level because telephone systems generally require that once the DC line current is established, it should not fluctuate for the duration of the call.

Figure 2:
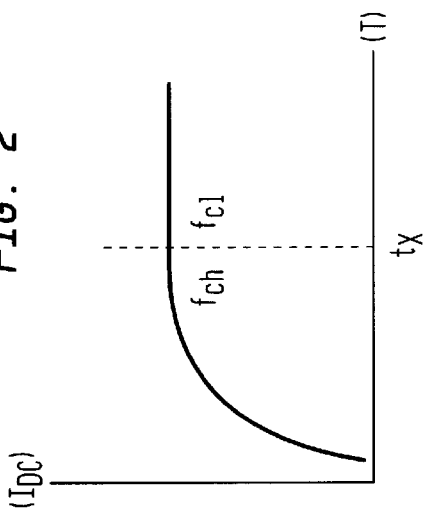
FIG. 2 is a graph of desired DC line current in relation to time.

FIG. 2 is illustrative of a desirable DC current rise over time. In FIG. 2, the filter 20 is changed from a low pass frequency filter with a high cutoff frequence $f_{ch}$ to a low pass frequency filter with a low cutoff frequency $f_{cl}$ at time $t_x$.

In order to digitally control the DC line current, a feedback loop between the tip 32 and ring 34 interface and the processor 78 needs to be established. In the current embodiment, the DC feedback path used to regulate the DC line current is shared with an AC feedback path, used to modulate the modem signal 30 onto a telephone line. In a preferred embodiment, an A/D converter 24 with a dynamic range of ±1V is used to minimize the operating voltage which must be maintained across the telephone line. To achieve a desirable modem signal 30 to noise (S/N) ratio, e.g., greater than approximately 80 dB, most of the dynamic range of A/D converter 24 must be used for the AC signal. Since most of the dynamic range of A/D converter 24 is reserved for the AC component of the feedback path, the DC component of the feedback path should be small. The DC component is thus reduced by using divider 35 to divide the DC voltage out of AC/DC separator 37. The value for divider 35 may be selected by assuming a worst case scenario, e.g., a tip 32 to ring 34 DC voltage of 64 volts, determining the maximum DC voltage that the A/D converter 24 can handle given its dynamic range as chosen for providing a high S/N ratio for the AC signal voltage, e.g., approximately 0.16 V DC, and then choosing a divider 35 value that is the ratio between the two. Therefore, the divider 35 value for this example may be 400 (64/0.16=400).

Since the resultant DC voltage is a comparatively small value, even a small DC offset introduced by A/D converter 24 may cause significant error in the resulting DC current between tip 32 and ring 34. A significant amount of error in the resulting DC current between tip 32 and ring 34 results from the processor 12 incorporating the value out of A/D converter 24 into calculations for setting the DC line current. Even if the DC offset is an order of magnitude smaller than the voltage out of divider 35, significant error could result due to the processor 12 interpreting the voltage on the tip 32 and ring 34 interface to be represented by the voltage on the tip 32 and ring 34 interface divided by divider 35. For example, if the tip 32 and ring 34 voltage is 40 volts, the divider is 400, and the DC offset is 0.01 V, the processor 12 would interpret the tip 32 and ring 34 voltage to be 44 V [(40/400+0.01)*400=44], an error of 10 percent. A 10 percent error in the interpreted tip 32 and ring 34 DC voltage level will cause all calculation made by processor 12 based off the DC voltage level to be in error and will result in the DC line current being in error unless the DC offset can be accommodated.

Figure 3:
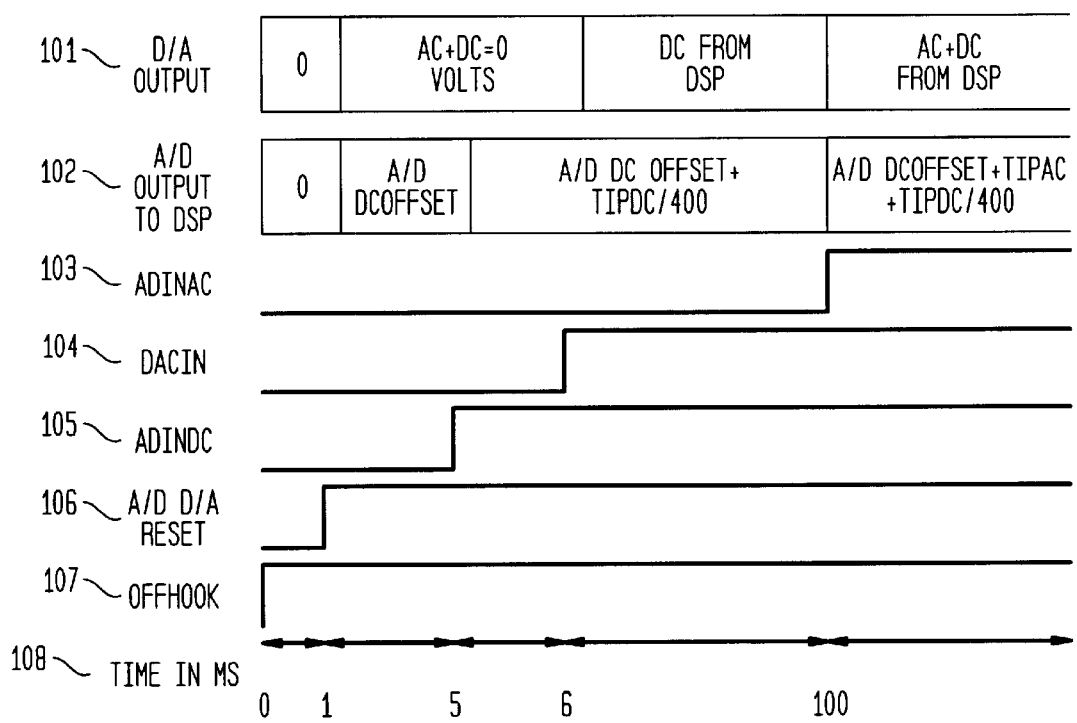
FIG. 3 is a timing diagram for the digital gyrator of FIG. 1 in accordance with the present invention.

Timing diagram 100 of FIG. 3 illustrates the interrelationship of signals within gyrator 10 at various times during system start up in accordance with a preferred embodiment of the invention. The scale 108 for timing diagram 100 is in milliseconds. In a preferred embodiment, the DC input from line 33 is not used for system operation as a gyrator 10 during the first 6 ms and the AC input from line 31 is not used for the first 100 ms. Since the DC input from line 33 is not required for the first 6 ms and the AC input from line 33 is not required for the first 100 ms, the system can manipulate the gyrator 10 circuitry during the first 6 milliseconds without affecting the operation of the gyrator 10. This allows the system enough time to calculate and store the DC offset of the A/D converter 24 without affecting system performance.

When the system first goes off-hook at 0 ms, as represented by off-hook time line 107 going high at 0 ms, the system components are activated. During the first 1 ms the A/D converter 24 and the D/A converter 26 are reset by coupling a low value to their respective reset terminals, as represented by A/D D/A reset time line 106. When the D/A converter 26 and A/D converter 24 are reset, the D/A converter 26 and the A/D converter 24 are restored to their default state of zero output. Thereafter, the A/D converter 24 and the D/A converter 26 operate as conventional converters.

In addition, on startup the system uses switch 27 to tie the AC voltage input of A/D) converter 24 to the common mode voltage and uses switch 29 to tie the DC voltage input of A/D converter 24 to ground. Tying the AC voltage input of A/D converter 24 to the common mode voltage and the DC voltage input of A/D converter 24 to ground, allows for the output of A/D converter 24 to be determined in the absence of any input. Accordingly, the processor 12 can measure the DC offset of A/D converter 24.

Also, during the initial off-hook period, the system uses switch 19 to tie the input of D/A converter 26 to ground. The system ties the input of the D/A converter 26 to ground for the first 6 ms, as represented by DACIN time line 104. Since the first 6 ms of AC and DC data are not required for operation of the gyrator 10, tying the input of D/A converter to ground does not affect system performance. The output of D/A converter 26 is zero during the first 6 ms due to the input of D/A converter 26 being tied to ground, as represented by D/A output time line 101. Tying the input of D/A converter 26 to ground allows current source 38 to solely control current source 28 though summer 36. Current source 38 is set to a default current used to control current source 28 which drives current to central office 18. This allows the analog circuits to settle before closing the AC and DC feedback paths and allowing processor 12 to control the gyrator 10.

From 1–5 ms, the A/D converter 24, having the AC input tied to $V_{CM}$ and the DC input tied to ground, sends a value to processor 12 which is the DC offset of A/D converter 24, as represented by A/D output to DSP time line 102. At anytime during this period, processor 12 may store the DC offset for use in future calculations. The DC offset will be subtracted out of future calculations performed by processor 12 which are based on the tip and ring DC voltage level. The feedback loop for the gyrator 10 will be closed by the processor 12 after a sufficient time for the offset to be stored, e.g., at 5 ms from system startup.

Thus, at 5 ms, switch 29 couples the DC input of A/D converter 24 to divider 35, whereby A/D converter 24 begins to receive a signal at its DC input which results in A/D converter 24 transferring the DC offset and a value representing the tip to ring DC voltage, as represented by ADINDC time line 105 and A/D output to DSP time line 102. Since processor 12 has the DC offset in storage, processor 12 can subtract out the DC offset of A/D converter 24 to obtain a true representation of the tip 32 to ring 34 DC voltage.

At 6 ms, switch 19 couples the input of D/A converter 26 to signal 25 out of processor 12, as represented by DACIN time line 104, and the output of D/A converter 26 begins to pass a DC signal developed by processor 12, as represented by D/A output time line 101. Thereafter, summer 36 passes the current out of D/A converter 26 and the current out of current source 38 to line current source 28 located within DAA 16 to develop the DC line current. Since the AC component of the feedback path is not used for the first 100 ms, the D/A output comprises the DC component from processor 12. Before the 100 ms point, the current comprises just the DC feedback current generated by the processor 12.

At 100 ms the gyrator 10 commences normal data operation. Specifically, at 100 ms switch 27 couples the AC input of A/D converter 24 to receive an AC signal at its AC input, as represented by ADINAC time line 103. A/D converter 24 transfers the DC offset, a value representing the tip to ring DC voltage, and a value representing the tip to ring AC voltage, as represented in A/D output to DSP time line 102. Now that switch 27 is closed, the AC feedback path is complete, allowing processor 12 to begin producing an AC signal along with the DC line current signal. Processor 12, which has the DC offset in storage, subtracts out the DC offset of A/D converter 24 to obtain a true representation of the tip and ring DC voltage when performing calculations based on the tip and ring DC voltage. The AC tip to ring voltage is processed to derive the data contained therein. The AC component of the feedback path and the DC component of the feedback path out of processor 12 are converted by D/A converter 26, as represented by D/A output time line 101. A signal representing the compensated DC voltage along with an AC modem signal is used to control current source 38 to add a DC current that is unaffected by DC offset onto the telephone line along with the outgoing AC current carrying transmit data. By calculating and storing the DC offset of the A/D converter and subtracting the offset out of future calculations, a superior digital gyrator can be achieved having reduced error over prior art gyrators.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for regulating the DC line current on a telephone line, comprising the steps of:
   interfacing a telecommunication device with a telephone company central office;
   deriving a first analog signal from said telecommunication device which is representative of the existing DC voltage imposed across said telecommunication device by said telephone line, wherein said first analog signal is used in a feedback loop to adjust the DC line current on said telephone line;
   converting said first analog signal to a first digital signal using a first circuit;
   determining a DC offset introduced by said step of converting said first analog signal to said first digital signal;
   storing said DC offset;
   subtracting said DC offset from future calculations;
   filtering said first digital signal to derive a second digital signal;
   converting said second digital signal to a second analog signal; and
   regulating a current source with said second analog signal, wherein said current source controls the DC line current on the telephone line.

2. The method of claim 1, wherein said determining step comprises:
   converting a third analog signal to a third digital signal using said first circuit, said third analog signal having a known value;
   determining a difference between said third digital signal and a known digital signal.

3. The method of claim 2, wherein said known digital signal would be the conversion of said third analog signal in the absence of said DC offset.

4. The method of claim 3, wherein said third analog signal is zero and said known digital signal is zero.

5. The method of claim 1, wherein said step of storing said DC offset is accomplished by writing said DC offset to a digital storage register.

6. The method of claim 1, wherein said step of subtracting said DC offset from future calculations is performed by a processor.

7. The method of claim 1, wherein said filtering step is performed by a processor.

8. The method of claim 7, wherein said analog to digital conversion step is accomplished using an analog-to-digital converter, and said digital to analog conversion step is accomplished using a digital-to-analog converter.

9. The method of claim 1, wherein said filtering step is performed by a digital processing circuit.

10. The method of claim 9, wherein said digital processing circuit processes said first digital signal using a predefined program.

11. The method of claim 1, further comprising the steps of:
    summing the second digital signal with a data signal to generate a current source control signal; and
    converting the current source control signal to generate the second analog signal.

12. The method of claim 1, further comprising the step of:
    scaling said second digital signal such that said step of scaling regulates the relationship between changes in the DC voltage across said telecommunication device and the DC line current controlled by said current source.

13. An apparatus for regulating the DC line current on a telephone line comprising:
    a data access arrangement having an AC output, a DC output and an input coupled with said telephone line, wherein said data access arrangement generates a signal at the AC output which represents the AC voltage across said telephone line and said data access arrangement generates a signal at the DC output which represent the DC voltage across said telephone line;
    a converter, having an output, an inherent output level representing a DC voltage, an AC input, and a DC input, for converting a signal produced by said data access arrangement to a digital signal;
    a first switch for alternatively coupling the AC input of said converter to a system common mode voltage or the AC output of said data access arrangement;
    a second switch for alternatively coupling the DC input of said converter to ground or the DC output of said data access arrangement;
    a processor for filtering said digital signal to derive a first control signal, wherein said processor removes the inherent output level of said converter from said digital signal; and
    a first controllable current source controlled by said control signal for setting the DC current on said telephone line.

14. The apparatus of claim 13, wherein the inherent output level representing a DC voltage of said converter is a constant output level, independent of the AC input and the DC input, which is factored out of calculations performed by said processor to reduce system error in controlling said DC current on said telephone line.

15. The apparatus of claim 14, wherein the inherent output level representing a DC voltage of said converter is determined by connecting the AC input to a known AC voltage level, connecting the DC input to a known DC voltage level, measuring the output of said converter, and subtracting a value which represents a desired output which correlates to the AC input and the DC input of said converter from the output of said converter.

16. The apparatus of claim 15, wherein said known AC voltage level is a common mode voltage level and said known DC voltage level is ground.

17. The apparatus of claim 16, wherein said desired output which correlates to the AC input and the DC input of said converter is digital zero.

18. The apparatus of claim 13, further comprising:
a second controllable current source for producing a second control current; and
a summer for combining the current of said second controllable current source with the first control signal to regulate said first controllable current source.

19. The apparatus of claim 13, wherein said processor comprises a digital processing circuit.

20. The apparatus of claim 19, wherein said converter comprises an analog-to-digital converter.

21. The apparatus of claim 19, wherein said processor scales said digital signal after filtering said digital signal.

22. The apparatus of claim 19, wherein said processor includes a filter with a selectable cutoff frequency.

23. The apparatus of claim 19, wherein said processor functions as a low pass filter with a first cutoff frequency prior to a predetermined time T1 and wherein said processor functions as a low pass filter with a second cutoff frequency after a predetermined time T1.

24. The apparatus of claim 19, wherein said processor includes a summer for summing a modem transmit signal to the filtered digital signal to generate a current source control signal.

25. An apparatus for regulating the DC line current on a telephone line connection between a telephone company central office and a data producing device comprising:
a data access arrangement (DAA) coupled to said telephone company central office, wherein said DAA comprises an AC/DC signal splitter and a controlled current source;
a coder/decoder (CODEC) coupled to said DAA for converting signals from said DAA to digital and converting signals to said DAA to analog, wherein said CODEC has a constant inherent output level which skews the output of the analog-to-digital portion of said CODEC;
a processor coupled to said CODEC, wherein said processor accommodates for said constant inherent output level of the analog-to-digital portion of said CODEC; and
a data source coupled to said processor;
such that said processor controls said controlled current source.

26. An apparatus for regulating the DC line current on a telephone line connected through a tip and ring connection coupled to a telephone company central office comprising:
a data access arrangement (DAA) coupled to said telephone company central office through said tip and ring connection, wherein said DAA comprises;
an AC/DC signal splitter having an analog AC output, an analog DC output,
and an input coupled to said tip connection; and
a controlled current source, having a controlled input, coupled between said tip and ring connection;
an analog-to-digital (A/D) converter having an analog AC input, an analog DC input, and a digital output;
a first switch for alternatively coupling the analog AC input of said A/D converter to a common mode voltage source or the analog AC output of said AC/DC signal splitter;
a divider circuit for reducing the voltage out of the analog DC output to an analog divided DC output;
a second switch for alternatively coupling the analog DC input of said A/D converter to a first ground terminal or the analog divided DC output;
a processor coupled to the output of said A/D converter for filtering and scaling the output of said A/D converter, and combining the filtered and scaled output of said A/D converter with a data signal to derive a digital control signal;
a digital-to-analog (D/A) converter having a digital input and an analog output coupled to said controlled current source for regulating the DC line current on said telephone line; and
a third switch for alternatively coupling the digital input of said D/A converter to said digital control signal or a second ground terminal.

27. The apparatus of claim 26 wherein said analog-to-digital converter introduces an error to said apparatus which is determined by said processor and said processor accommodates for said error during said filtering and scaling.

28. The apparatus of claim 27 wherein said processor is programmed to control said first and second switches to place said apparatus in a first mode such that the output of said A/D converter represents a DC offset of said A/D converter that is determined by said processor while in said first mode, said processor further programmed to control said first and second switches to place said apparatus in a second mode and wherein, when in said second mode, said processor compensates for said DC offset determined while in said first mode.

29. The apparatus of claim 26 further comprising:
a summer, having a first input, a second input, and an output, coupled between said analog output of said D/A converter at the first input and said controlled current source at the output; and
a current source coupled to the second input; such that said current source provides current during startup and operation of said apparatus.

* * * * *